Patented Dec. 17, 1940

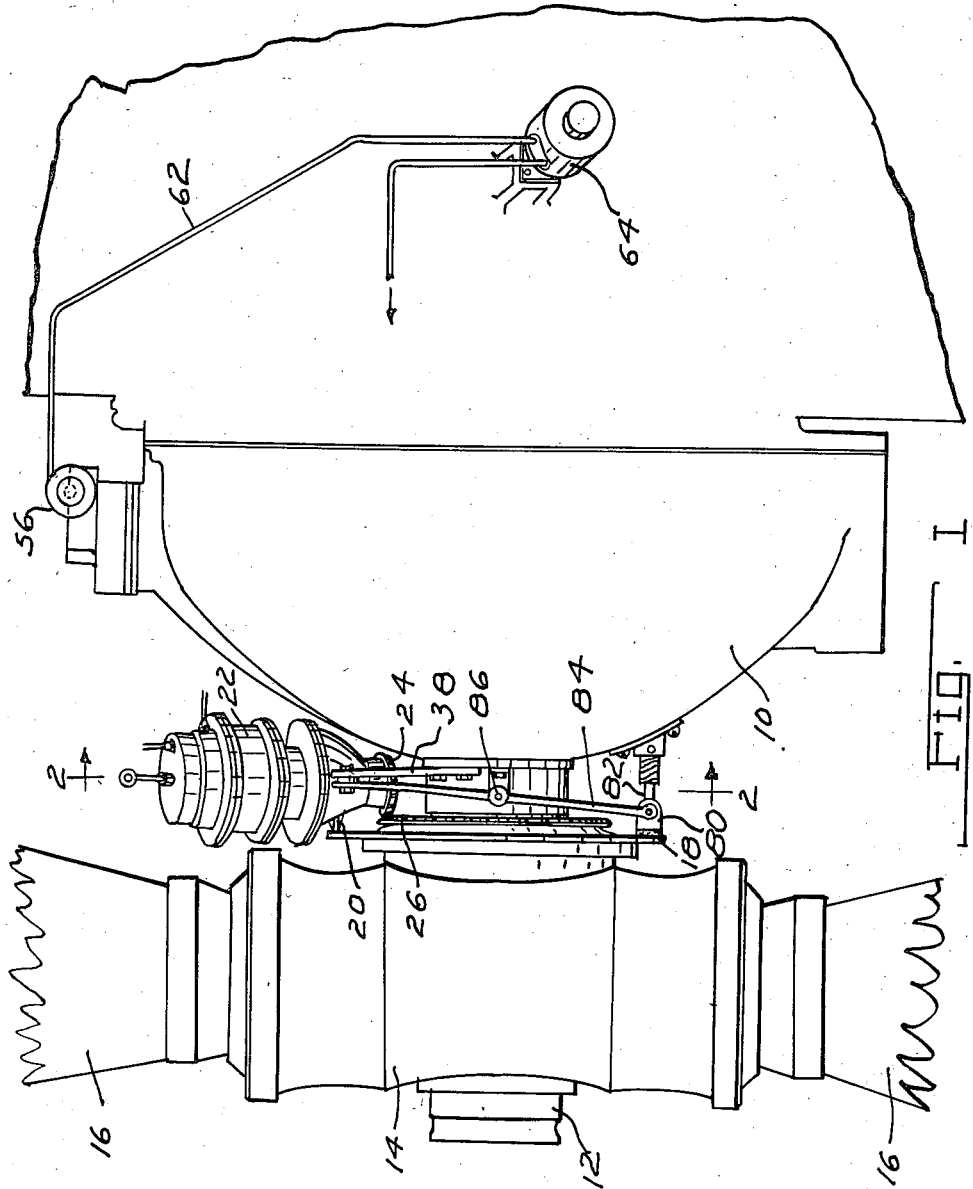

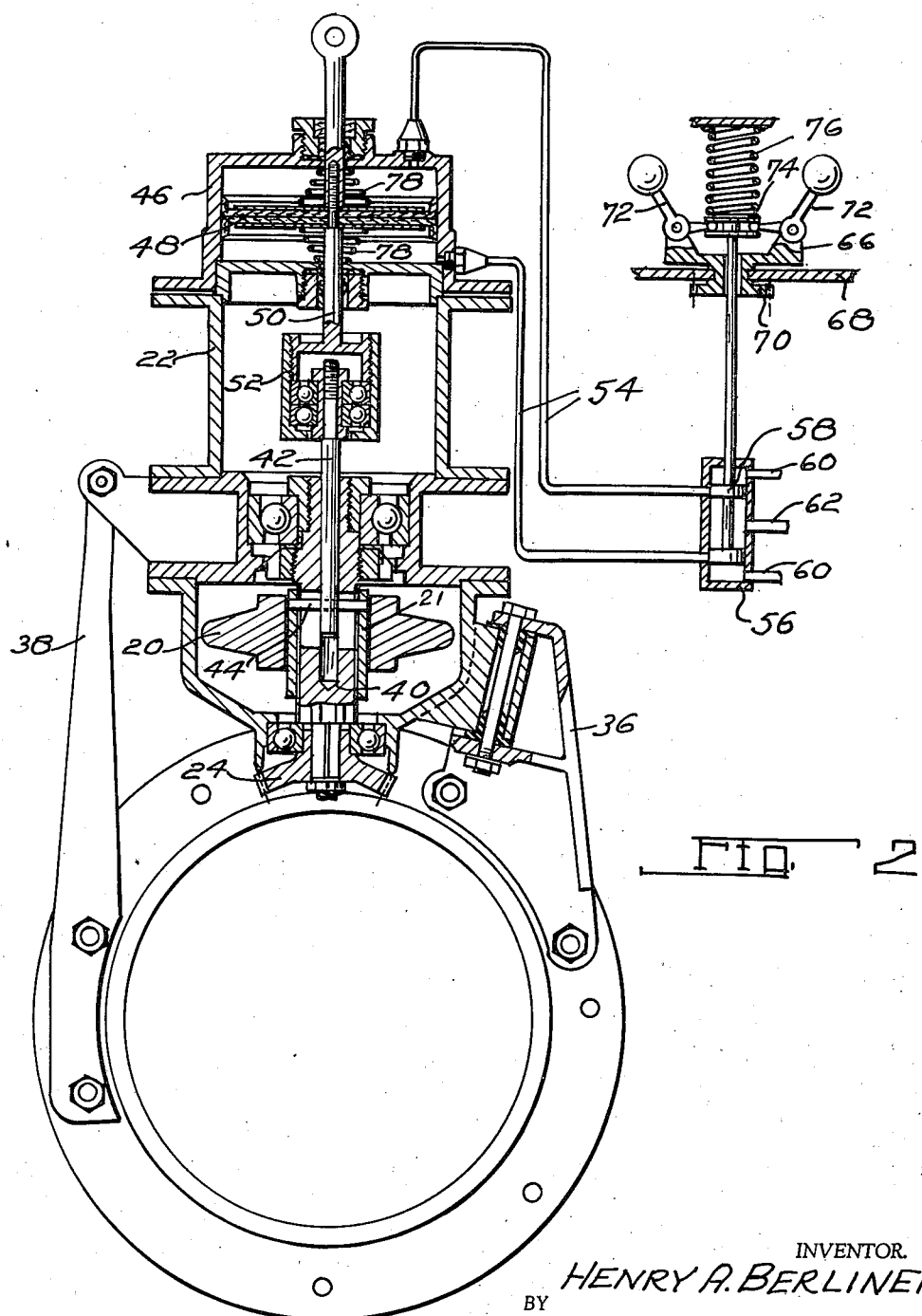

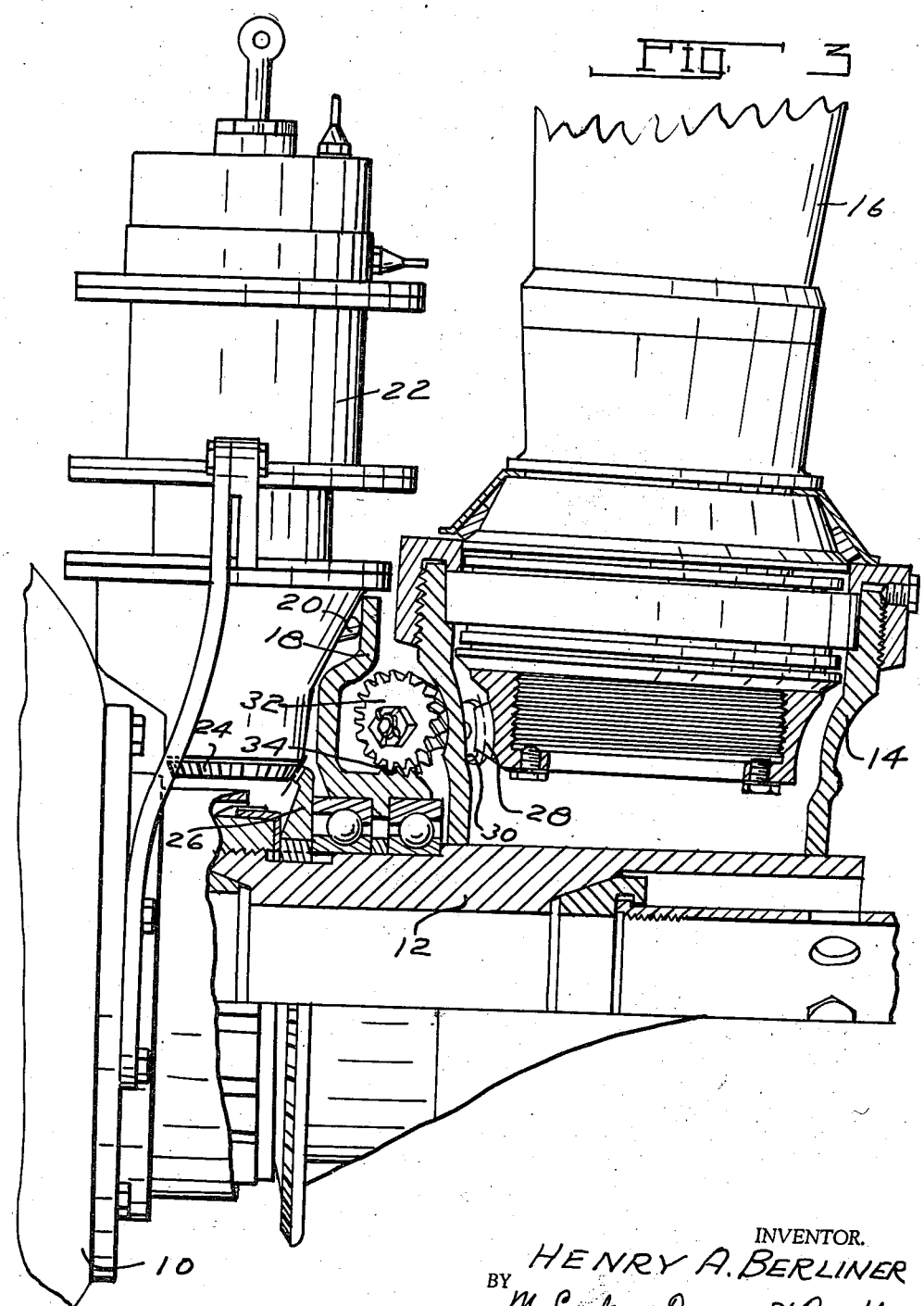

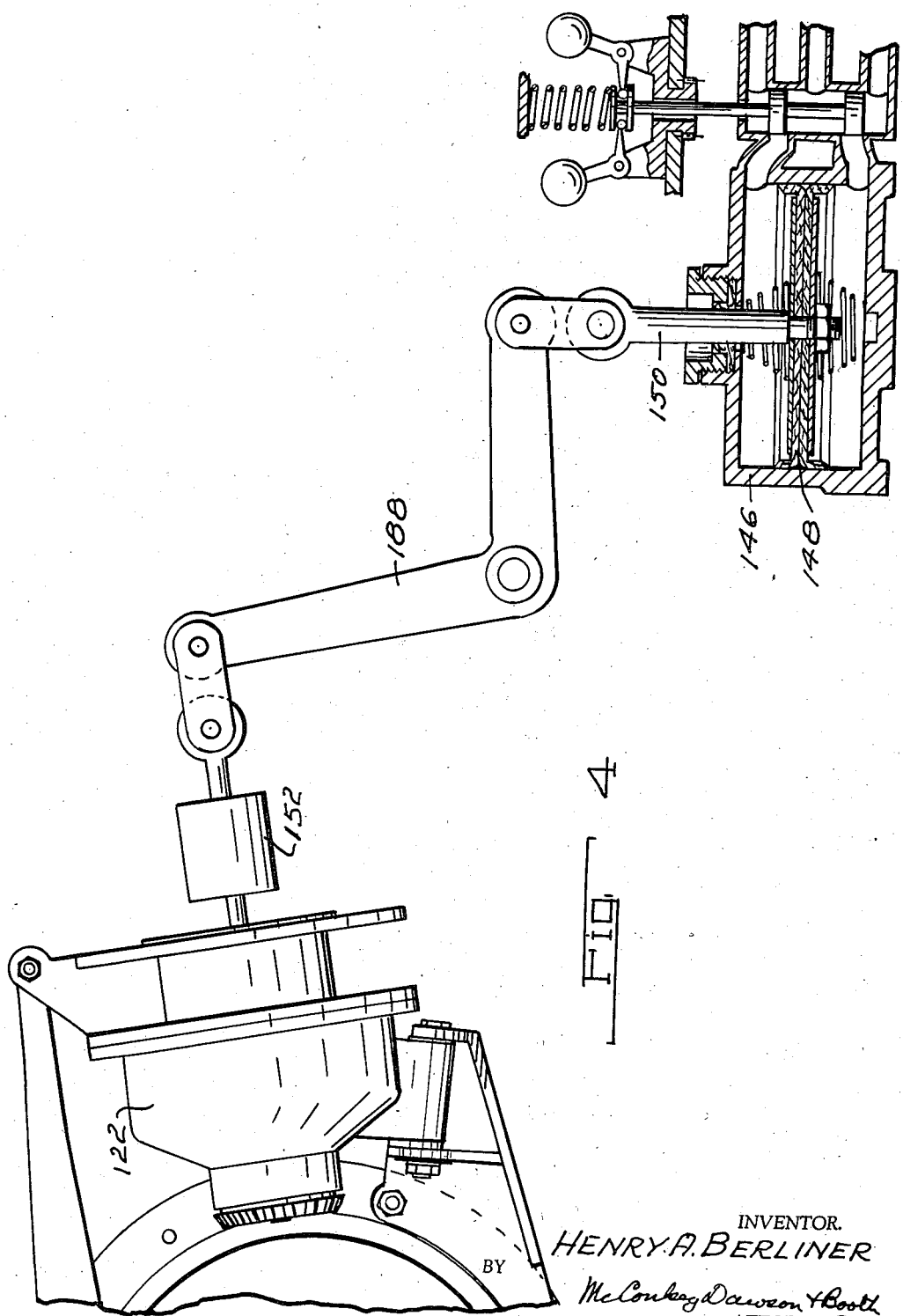

2,225,408

UNITED STATES PATENT OFFICE 2,225,408

VARIABLE PITCH PROPELLER

Henry A. Berliner, Washington, D. C., assignor, by mesne assignments, to Engineering and Research Corporation, Riverdale, Md., a corporation of Maryland Application May 11, 1938, Serial No. 207,264

16 Claims. (Cl. 170—163)

This invention relates to variable pitch propellers and more particularly to propellers in which the pitch of the blades is controlled pneumatically.

One of the objects of the invention is to provide a variable pitch propeller in which the pitch is changed by a variable speed transmission controlled pneumatically. Preferably the pneumatic control is in turn controlled automatically by a speed responsive governor or the like.

Another object of the invention is to provide a variable pitch propeller in which a variable speed transmission is arranged adjacent the propeller hub to change the blade pitch and a control device is mounted remote from the transmission and connected thereto pneumatically. In one desirable arrangement the control device includes a valve and governor mounted on the engine with the governor drivably conected thereto.

Still another object is to provide a variable pitch propeller in which the blade pitch is normally changed at a relatively slow rate and in which means are provided for changing the pitch rapidly at will. In one form the blade pitch is normally controlled by a variable speed transmission and a brake is provided to hold the driven transmission element stationary to effect a rapid pitch change. This arrangement is particularly useful for feathering the blades.

Other objects and advantages of the invention including novel subcombinations and structural features will be apparent from the following description when read in connection with the accompanying drawings, in which:

Figure 1 is a partial side view of an engine and a propeller embodying the invention;

Figure 2 is an enlarged section substantially on the line 2—2 of Figure 1;

Figure 3 is a partial section at right angles to Figure 2; and

Figure 4 is a diagrammatic view of a modified construction.

Referring more particularly to Figure 1, there is shown an engine 10 having a driven shaft 12 which may be an extension of the engine crank shaft and which carries a hub 14. Blades 16 are rotatably mounted in opposed sockets in the hub and are operatively connected to an annular ring 18 surrounding the shaft 12. The ring 18 is driven by a roller 20 having a splined hub sleeve 21 and slidably and rotatably supported in a housing 22, the roller 20 being driven by gear 24 meshing with an annular gear 26 which is secured to the shaft 12.

As best seen in Figure 3, the root end of each blade 16 is formed with a worm gear 28 meshing with a worm 30 which is driven by a pinion 32. The pinion 32 meshes with a worm thread 34 formed on an extending hub of the disc 18, so that when the disc is rotated relative to the hub, the worm 30 will be turned to turn the blades in their sockets.

The housing 22 is pivotally mounted on a bracket 36 secured to a stationary part adjacent the forward end of the engine and a leaf spring 38 is secured to the housing on the side opposite the hinge to urge the housing in a direction to press the roller 20 against the disc 18. As best seen in Figure 2, the gear 24 is connected to a sleeve 40 which is rotatably mounted in the housing 22 and which has a rod 42 extending axially therethrough. A pin 44 carried by the rod 42 extends through slots in the sleeve 40 and is connected to the roller hub 21 which is splined on the sleeve 40; thus by moving the rod 42, the position of the roller can be adjusted to vary the transmission ratio between the roller and disc.

In order to adjust the rod 42, there is provided a cylinder 46 secured to the housing 22 and carrying a piston 48 having a piston rod 50. A bearing member 52 rotatably connects the piston rod 50 with the rod 42 so that axial movement of the piston will shift the rod 42, this rod being free to rotate relative to the piston. Actuating fluid is supplied to the cylinder 46 on opposite sides of the piston through pipes 54 leading to a valve 56. A spool 58 is slidably mounted in the valve casing and controls connection of the pipes 54 with atmospheric vent pipes 60 or with a pipe 62 leading to a suitable source of vacuum. As shown in Figure 1, the pipe 62 is connected to an engine driven vacuum pump, although it will be apparent that manifold vacuum could be employed if desired.

The blade pitch, according to the present invention, is controlled automatically by variations in propeller speed to maintain the propeller speed substantially constant. In order to effect this control, a speed responsive governor is provided constituted by a block 66 rotatably mounted in a fixed engine part 68 and having a gear 70 by which it is drivably connected to the engine. Since the shaft 12 is connected directly to the engine, it will be apparent that the governor is responsive to the speed of the shaft. A pair of fly ball weights 72 are pivotally connected to the block 66 and engage a collar 74 whose movement is opposed by a coil spring 76. The spring is preferably calibrated to center the valve at the desired engine speed, suitable means for adjusting the spring tension being provided if desired.

The roller 20 is normally in a central position in which it drives the disc 18 at the same speed as the shaft 12. Since the gear 32 and the disc are rotating at the same speed under these conditions, the worm 30 will be stationary and the blades will be held against rotation in their sockets. If the propeller speed should increase for any reason, as for example due to a decrease in air density, the weights 72 would move out and raise the valve 58. This would connect the upper part of the cylinder 46 with the suction pipe 62 and the lower part of the cylinder with the lower vent pipe 60. The piston 48 would therefore move up, moving the roller 20 up to decrease the speed of the disc. This causes rotation of the pinion 32 and worm 30 to rotate the blades in their sockets in a direction to increase the blade pitch, thereby decreasing the speed of the propeller. When the pitch has increased sufficiently to reduce the propeller speed to normal, the valve 58 will again be centered and the roller 20 will move back to its neutral position. In order to insure proper centering of the roller 20, opposed springs 78 may be provided in the cylinder 46 tending to center the piston 48. Upon a decrease in speed, the valve will be shifted in the opposite direction to move the roller 20 inwardly on the disc 18, thereby to decrease the blade pitch.

According to a further feature of the invention, the disc 18 may be braked so that it will have a very high speed relative to the shaft, thereby to effect a rapid change in pitch. As shown in Figure 1, a brake shoe 80 is provided adjacent the disc 18 adapted to be moved into engagement with the disc by a thrust device 82 remotely controlled from the pilot's cockpit, as for example through a cable and conduit device. The brake shoe 80 is connected to a lever 84 pivotally mounted intermediate its ends at 86 and which is connected at its upper end to the housing 22 adjacent the point of connection of the spring 38 therewith. When the brake shoe is moved forwardly into engagement with the disc 18, the housing 22 will be swung about its pivotal axis to move the roller 20 out of engagement with the disc. At this time with the disc held stationary and the propeller rotating, the disc will have a high rate of relative movement to the propeller to turn the worm and the propeller blades rapidly in a pitch increasing direction. This arrangement is particularly useful in feathering the blades.

Figure 4 illustrates a modified arrangement in which parts corresponding to like parts in Figures 1 to 3 have been indicated by the same reference numerals plus 100. In this construction the cylinder 146 is mounted on a fixed engine part remote from the propeller hub and the piston rod 150 is connected to the bearing device 152 through a bell crank lever 188 pivoted on a fixed part intermediate its ends. With this construction the housing 122 may be considerably reduced in size so as to reduce the wind resistance of parts immediately adjacent the hub, and the power cylinder 146 may be mounted inside the engine cowling or the like. In operation the arrangement shown in Figure 4 is identical with that in Figures 1 to 3.

While two embodiments of the invention have been shown and described in detail, it is understood that these are illustrative only and that parts of different form might be used while retaining the principles involved. It is therefore not intended to limit the scope of the invention to the exact forms shown nor otherwise than by the terms of the appended claims.

What is claimed is:

1. A variable pitch propeller comprising a propeller shaft a hub on said shaft, blades rotatably mounted in said hub, an annular disc rotatably mounted on the shaft adjacent said hub and connected to the blades to turn them when the disc is rotated relative to the hub, a driving roller engaging said disc, means connecting the shaft and roller to drive said roller at a speed having a constant ratio to the shaft speed, and pneumatic means to adjust said roller to vary its point of engagement with the disc thereby to vary the speed of the disc.

2. A variable pitch propeller comprising a propeller shaft a hub on said shaft, blades rotatably mounted in said hub, an annular disc rotatably mounted on the shaft adjacent said hub and connected to the blades to turn them when the disc is rotated relative to the hub, a driving roller engaging said disc, means connecting the shaft and roller to drive said roller at a speed having a constant ratio to the shaft speed, pneumatic means to adjust the position of the roller to vary its point of engagement with the disc, a control valve for said pneumatic means, and a governor responsive to the propeller speed to operate the control valve.

3. A variable pitch propeller comprising a propeller shaft, a hub on said shaft, blades rotatably carried by said hub, an annular disc rotatably mounted on said shaft coaxially therewith, a driving roller engaging said disc, means connecting the shaft and roller for driving said roller at a speed having a constant ratio to the shaft speed, means drivably connecting the disc to the blades, and pneumatic means for adjusting the position of the driving roller to vary the point of engagement with the disc to vary the speed of the disc relative to the shaft.

4. A variable pitch propeller comprising a propeller shaft, a hub on said shaft, blade rotatably carried by said hub, an annular disc rotatably mounted on said shaft coaxially therewith, a driving roller engaging said disc, means connecting the shaft and roller for driving said roller at a speed having a constant ratio to the shaft speed, means drivably connecting the disc to the blades, pneumatic means for adjusting the position of the driving roller to vary its point of engagement with the disc to vary the speed of the disc relative to the shaft, and a control valve for said pneumatic means remote from the pneumatic means and roller.

5. A variable pitch propeller comprising a propeller shaft, a hub on said shaft, blades rotatably carried by said hub, an annular disc rotatably mounted on said shaft coaxially therewith, a driving roller engaging said disc, means connecting the shaft and roller for driving said roller at a speed having a constant ratio to the shaft speed, means drivably connecting the disc to the blades, pneumatic means for adjusting the position of the driving roller to vary its point of engagement with the disc to vary the speed of the disc relative to the shaft, a control valve for said pneumatic means remote from the pneumatic means and roller, and a governor responsive to the speed of the shaft to operate the control valve.

6. A variable pitch propeller comprising a propeller shaft, a hub on said shaft, blades rotatably carried by said hub, an annular disc rotatably mounted on said shaft coaxially therewith, a driving roller engaging said disc, means connecting the shaft and roller for driving said roller at a speed having a constant ratio to the shaft speed, means drivably connecting the disc to the blade, power means including a fixed cylinder and a piston in the cylinder connected to the roller to adjust the roller to vary its point of engagement with the disc, and valve means to control connection of the cylinder to a source of actuating fluid.

7. A variable pitch propeller comprising a propeller shaft, a hub on said shaft, blades rotatably carried by said hub, an annular disc rotatably mounted on said shaft coaxially therewith, a driving roller engaging said disc, means connecting the shaft and roller for driving said roller at a speed having a constant ratio to the shaft speed, means drivably connecting the disc to the blades, power means including a fixed cylinder and a pistion in the cylinder connected to the roller to adjust the roller to vary its point of engagement with the disc, a control valve for the power means, and a governor responsive to the propeller speed for operating the control valve.

8. A variable pitch propeller comprising a propeller shaft, a hub on said shaft, blades rotatably carried by said hub, an annular disc rotatably mounted on said shaft coaxially therewith, a driving roller engaging said disc, means operable by the shaft for driving said roller, means drivably connecting the disc to the blades, means for adjusting the roller to vary the speed of the disc, brake means engageable with the disc to hold it stationary, and means for engaging said brake means with the disc and simultaneously disengaging the roller therefrom.

9. A variable pitch propeller comprising a propeller shaft, a hub, blades rotatably carried by said hub, a member movably mounted adjacent the hub and directly geared to the blades to turn the blades when the member is moved relative to the hub, variable speed driving means driven by said shaft and drivably engaging said member for moving said member, a brake for holding said member stationary, and operating means for engaging said brake with the member and simultaneously disengaging the driving means therefrom.

10. A variable pitch propeller comprising a propeller shaft, a hub, blades rotatably carried by said hub, a member rotatably mounted adjacent the hub and directly geared to the blades to turn the blades when the member is rotated relative to the hub, variable speed driving means driven by said shaft and drivably engaging said member for rotating said member, a brake for holding said member stationary, and operating means for engaging said brake with the member and simultaneously disengaging the driving means therefrom.

11. A variable speed transmission comprising a propeller shaft, a hub on said shaft, blades rotatably mounted in the hub, an annular disc rotatably surrounding the shaft and drivably connected to the blades to turn them in the hub, a driving roller driven by the propeller shaft and engageable with the disc to turn it, a brake engageable with the disc to hold it stationary, and means for moving the brake into engagement with the disc and simultaneously disengaging the roller therefrom.

12. A variable speed transmission comprising a propeller shaft, a hub on said shaft, blades rotatably mounted in the hub, an annular disc rotatably surrounding the shaft and drivably connected to the blades to turn them in the hub, a driving roller mounted for movement into and out of engagement with the disc, means for yieldingly urging the roller into engagement with the disc, means for driving the roller from the shaft, a brake movable into and out of engagement with the disc, and means for moving the brake into engagement with the disc and simultaneously moving the roller out of engagement therewith.

13. In a variable pitch propeller having a shaft and blades rotatably carried by the shaft, pitch changing mechanism comprising an annular disc coaxial with the shaft, means connecting the disc to the blades to turn them, a housing pivotally mounted adjacent the disc, a driving roller rotatably and slidably carried by the housing and engageable with the disc to drive it, means operable from the shaft to drive said roller, means for sliding the roller axially in the housing to change its point of engagement with the disc, and means for yieldingly urging the housing in a direction to bring the roller into driving engagement with the disc.

14. In a variable pitch propeller having a shaft and blades rotatably carried by the shaft, pitch changing mechanism comprising an annular disc coaxial with the shaft, means connecting the disc to the blades to turn them, a housing pivotally mounted adjacent the disc, a driving roller slidably and rotatably carried by the housing and engageable with the disc to drive it, means in the housing to slide the roller to change its point of engagement with the disc, means operable from the shaft to drive said roller, and means for yieldingly urging the housing in a direction to bring the roller into driving engagement with the disc.

15. In a variable pitch propeller having a shaft and blades rotatably carried by the shaft, pitch changing mechanism comprising an annular disc coaxial with the shaft, means connecting the disc to the blades to turn them, a housing pivotally mounted adjacent the disc, a driving roller rotatably and shiftably carried by the housing and engageable with the disc to drive it, means operable from the shaft to drive said roller, means to shift the roller to change its point of engagement with the disc, means for yieldingly urging the housing in a direction to bring the roller into driving engagement with the disc, a brake engageable with the disc, and means to move the brake into engagement with the disc and simultaneously to pivot the housing in a direction to disengage the roller from the disc.

16. In a variable pitch propeller having a shaft and blades rotatably carried by the shaft, pitch changing mechanism comprising an annular disc coaxial with the shaft, means connecting the disc to the blades to turn them, a housing pivotally mounted adjacent the disc, a driving roller slidably and rotatably carried by the housing and engageable with the disc to drive it, said housing being formed with a cylinder, a piston in the cylinder connected to the roller to slide it, a control valve controlling operation of said piston, means operable from the shaft to drive said roller, and means for yieldingly urging the housing in a direction to bring the roller into driving engagement with the disc.

HENRY A. BERLINER.